United States Patent
Lee et al.

(10) Patent No.: US 11,126,322 B2
(45) Date of Patent: Sep. 21, 2021

(54) ELECTRONIC DEVICE AND METHOD FOR SHARING IMAGE WITH EXTERNAL DEVICE USING IMAGE LINK INFORMATION

(71) Applicant: SAMSUNG ELECTRONICS CO., LTD., Suwon-si (KR)

(72) Inventors: Arang Lee, Suwon-si (KR); Hyunho Kim, Suwon-si (KR); Hyunhee Park, Seoul (KR); Jiwon Choi, Suwon-si (KR); Donghyun Yeom, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/194,533

(22) Filed: Nov. 19, 2018

(65) Prior Publication Data

US 2019/0155485 A1    May 23, 2019

(30) Foreign Application Priority Data

Nov. 21, 2017  (KR) .................. 10-2017-0155547

(51) Int. Cl.
*G06F 3/0481* (2013.01)
*H04N 5/225* (2006.01)
(Continued)

(52) U.S. Cl.
CPC ........ *G06F 3/04817* (2013.01); *G06F 1/1686* (2013.01); *H04N 5/2254* (2013.01);
(Continued)

(58) Field of Classification Search
CPC .. G06F 3/04817; G06F 1/1686; G06F 3/0482; H04N 5/232935; H04N 5/772;
(Continued)

(56) References Cited

U.S. PATENT DOCUMENTS

| | | | |
|---|---|---|---|
| 8,964,947 B1* | 2/2015 | Noolu | H04M 3/541 379/88.01 |
| 2010/0070842 A1* | 3/2010 | Aymeloglu | G06F 3/0484 715/207 |

(Continued)

FOREIGN PATENT DOCUMENTS

KR    10-1685932    12/2016

OTHER PUBLICATIONS

International Search Report dated Feb. 25, 2019 in counterpart International Patent Application No. PCT/KR2018/014206.

*Primary Examiner* — Andrey Belousov
(74) *Attorney, Agent, or Firm* — Nixon & Vanderhye P.C.

(57) ABSTRACT

An image sharing method and device is provided. An electronic device of the present disclosure includes a communication module comprising communication circuitry, a memory, and a processor, wherein the processor is configured to control the electronic device to: receive information on an image selected to be shared with another external electronic device from an external device, ascertain link information of the image that is stored as part of attribute information of the image based on the received information, transmit, if the link information is stored as part of the attribute information of the image, the link information to the other external electronic device, and store the information on the other external electronic device as part of the attribute information in association with the link information.

11 Claims, 16 Drawing Sheets

(51) Int. Cl.
*H04N 5/232* (2006.01)
*G06F 1/16* (2006.01)
*H04N 5/77* (2006.01)
*H04N 9/82* (2006.01)
*H04N 9/04* (2006.01)

(52) U.S. Cl.
CPC ..... *H04N 5/23229* (2013.01); *H04N 5/23258* (2013.01); *H04N 5/23287* (2013.01); *H04N 5/232935* (2018.08); *H04N 5/772* (2013.01); *H04N 9/045* (2013.01); *H04N 9/8205* (2013.01)

(58) Field of Classification Search
CPC ........... H04N 5/23258; H04N 5/23287; H04N 9/8205; H04N 9/045; H04N 5/2254; H04N 5/23229
USPC ........................................................ 715/835
See application file for complete search history.

(56) References Cited

U.S. PATENT DOCUMENTS

| | | | |
|---|---|---|---|
| 2013/0021368 A1* | 1/2013 | Lee | H04N 1/00153 345/619 |
| 2013/0103742 A1 | 4/2013 | Hsi | |
| 2013/0194438 A1 | 8/2013 | Sweet, III et al. | |
| 2013/0332857 A1 | 12/2013 | Kim et al. | |
| 2015/0039616 A1 | 2/2015 | Rolston et al. | |
| 2015/0264015 A1 | 9/2015 | Cialdea et al. | |
| 2016/0359987 A1* | 12/2016 | Laliberte | H04W 4/14 |

\* cited by examiner

ELECTRONIC DEVICE AND METHOD FOR SHARING IMAGE WITH EXTERNAL DEVICE USING IMAGE LINK INFORMATION

CROSS-REFERENCE TO RELATED APPLICATION

This application is based on and claims priority under 35 U.S.C. § 119 to Korean Patent Application No. 10-2017-0155547, filed on Nov. 21, 2017, in the Korean Intellectual Property Office, the disclosure of which is incorporated by reference herein in its entirety.

TECHNICAL FIELD

The present disclosure relates to an image sharing method and electronic device therefor.

BACKGROUND

A camera module is integrated into various electronic devices like smartphones, tablet personal computers (PCs), and wearables portable (such as multimedia players (PMPs), laptop PCs, write watches, and head-mounted displays (HMDs)) for taking pictures.

Meanwhile, it has become part of our everyday life to take and upload pictures to a social network service (SNS) by means of the camera-integrated devices.

A problem arises in that it is inevitable to consume communication resources for data transfer whenever a user uploads the images taken by means of the camera integrated in the electronic device.

Another problem arises in that it is difficult to manage access to the uploaded images and access history.

SUMMARY

The present disclosure addresses the above problems and provides an image sharing method and device capable of facilitating image sharing and image history management using a cloud service.

In accordance with an aspect of the present disclosure, an electronic device is provided. The electronic device includes a communication module comprising communication circuitry, a memory, and a processor, wherein the processor is configured to control the electronic device to: receive information on an image selected to be shared with another external electronic device from an external device, ascertain link information of the image that is stored as part of attribute information of the image based on the received information, transmit, if the link information is stored as part of the attribute information of the image, the link information to the other external electronic device, and store the information on the other external electronic device as part of the attribute information in association with the link information.

In accordance with another aspect of the present disclosure, an image sharing method of an electronic device is provided. The image sharing method includes receiving information on an image selected to be shared with another external electronic device from an external device, ascertaining link information of the image that is stored as part of attribute information of the image based on the received information, transmitting, if the link information is stored as part of the attribute information of the image, the link information to the other external electronic device, and storing the information on the other external electronic device as part of the attribute information in association with the link information.

In accordance with another aspect of the present disclosure, an electronic device is provided. The electronic device includes a communication module comprising communication circuitry, an input device comprising input circuitry, a display device, a memory, and a processor, wherein the processor is configured to control the electronic device to: receive information on an image database containing at least one image, display the image database on the display device and displaying, if an input for selecting at least one image from the image database is received via the input device, the selected image and a representative image associated with the link information of the selected image on the display device.

In accordance with another aspect of the present disclosure, an image sharing method of an electronic device is provided. The image sharing method includes receiving information on an image database containing at least one image from a cloud server, displaying the image database on a display device, and displaying, if an input for selecting at least one image from the image database is received via an input device, the selected image and a representative image associated with the link information of the selected image on the display device.

In accordance with still another aspect of the present disclosure, an electronic device is provided. The electronic device includes a communication circuit, a memory, and a processor, wherein the processor is configured to control the communication circuit to transmit an image stored in the memory to an external electronic device, ascertain link information associated with the external electronic device corresponding to the transmitted image, and store the link information associated with the external electronic device as part of attribute information of the image.

BRIEF DESCRIPTION OF THE DRAWINGS

The above and other aspects, features and advantages of certain embodiment of the present disclosure will be more apparent from the following detailed description, taken in conjunction with the accompanying drawings, in which.

DETAILED DESCRIPTION

Figure 1:
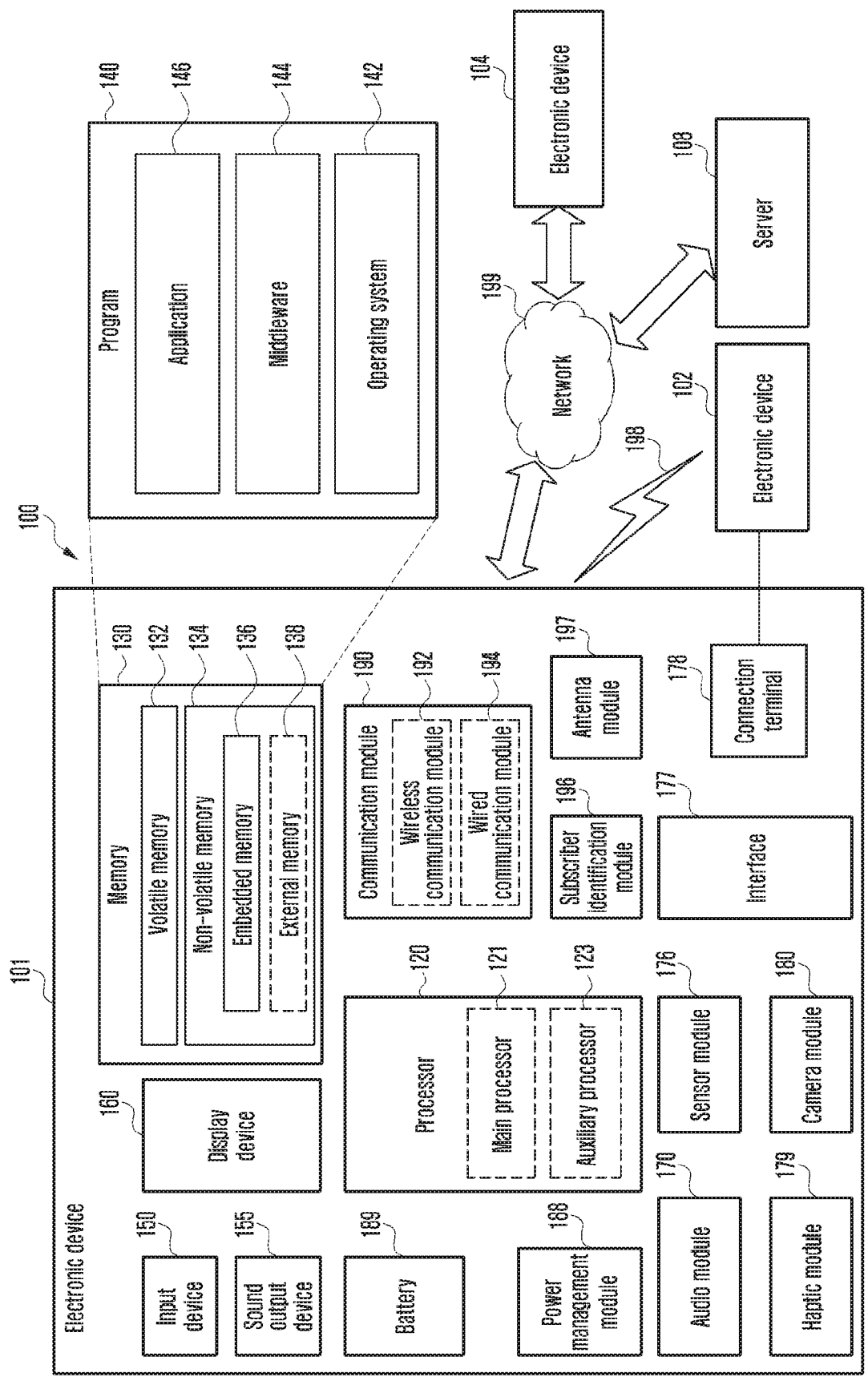
FIG. 1 is a block diagram illustrating a configuration of an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™' wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
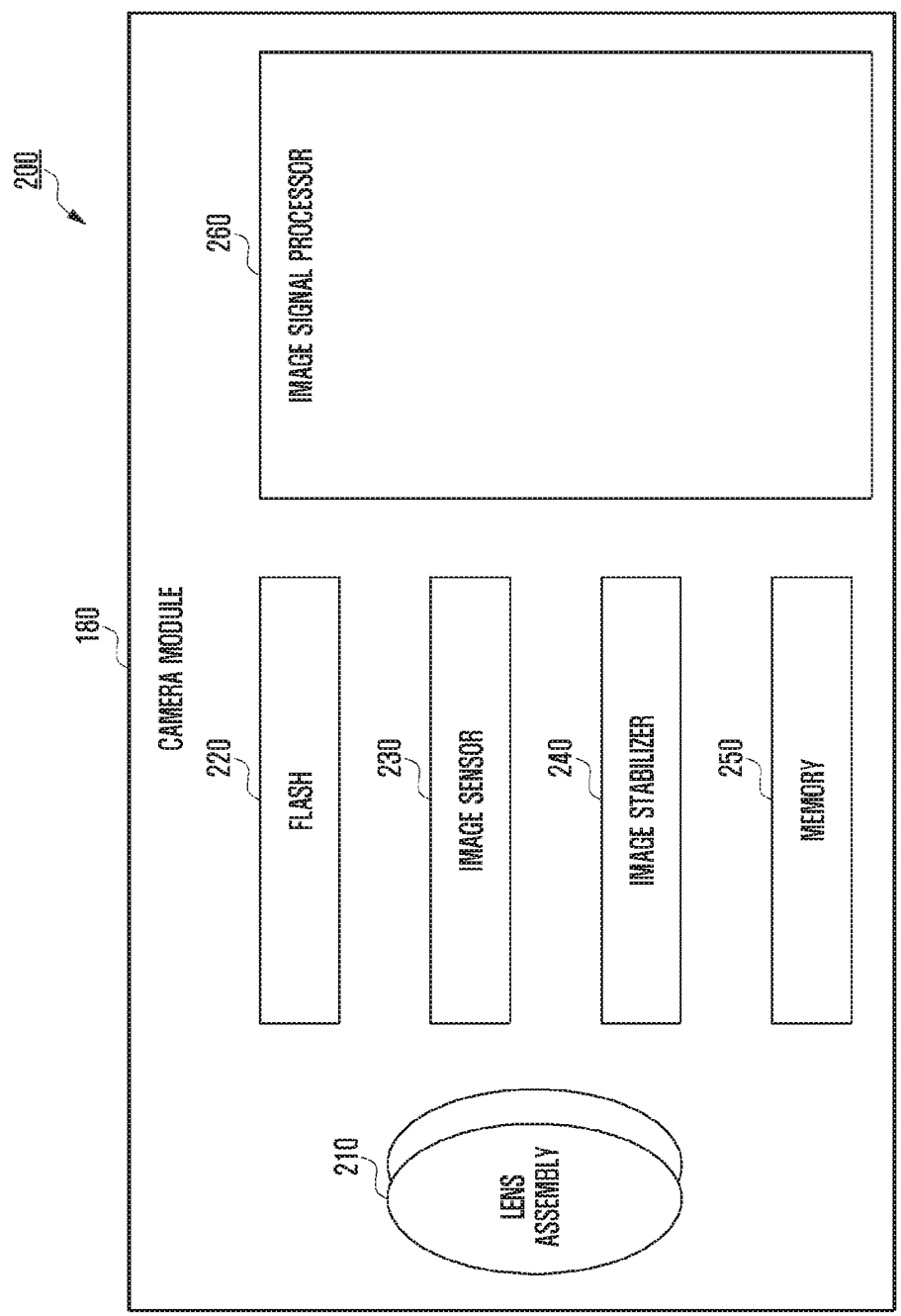
FIG. 2 is a block diagram illustrating a configuration of a camera module according to various embodiments of the present disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, and without limitation, a dual camera, a 360-degree camera, a spherical camera, or the like. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may, for example, and without limitation, include one or more light emitting diodes (LEDs) (e.g., a red-green-blue (RGB) LED, a white LED, an infrared (IR) LED, and/or an ultraviolet (UV) LED) and/or a xenon lamp. The image sensor 230 may obtain an image corresponding to an object by converting light emitted or reflected from the object and transmitted via the lens assembly 210 into an electrical signal. According to an embodiment, the image sensor 230 may, for example, and without limitation, include at least one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, and without limitation, a charged coupled device (CCD) sensor, a complementary metal oxide semiconductor (CMOS) sensor, or the like.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
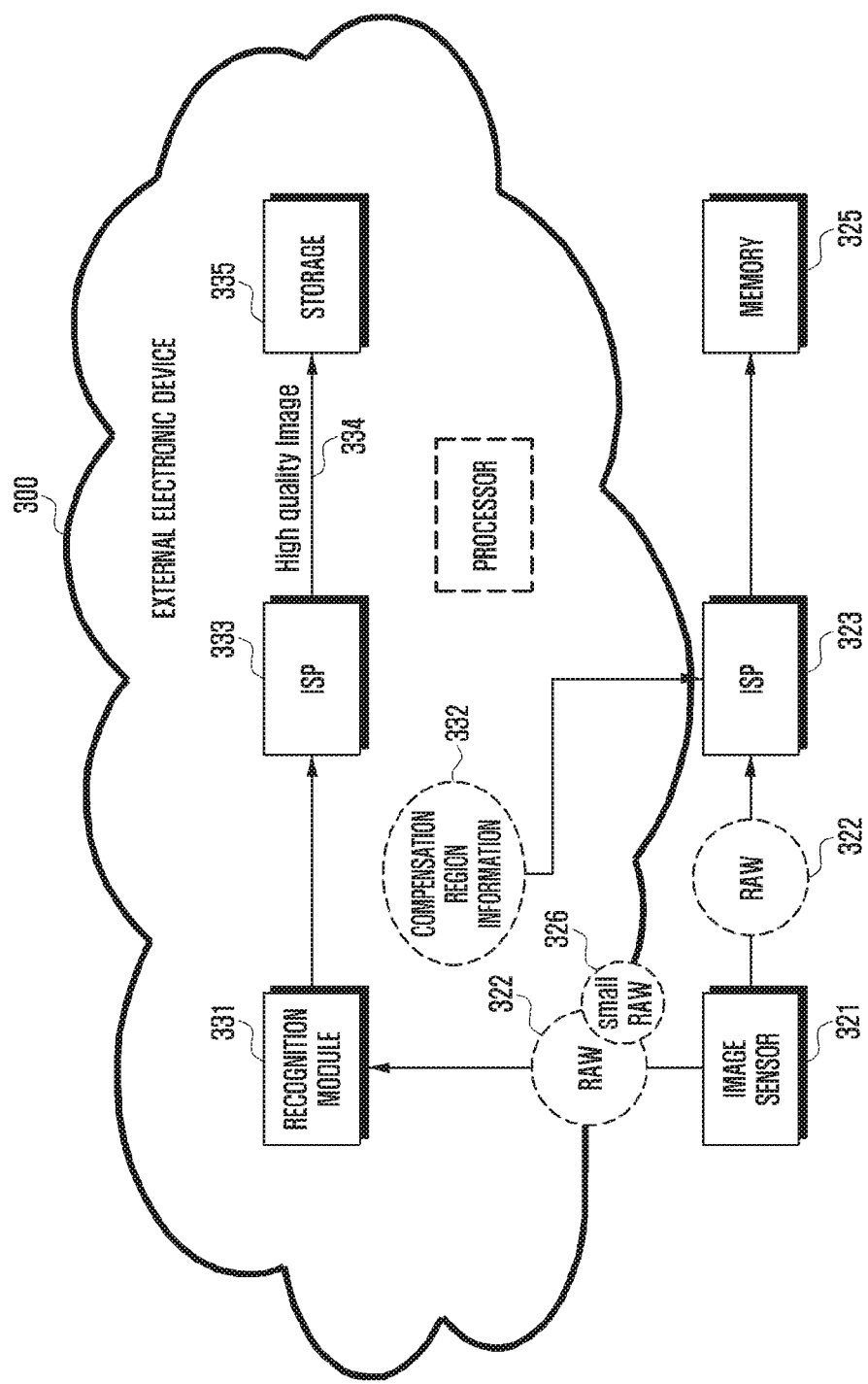
FIG. 3 is a diagram illustrating operations of an electronic device and an external electronic device according to various embodiments of the present disclosure.

FIG. 3 is a diagram illustrating operations of the electronic device 101 and the external electronic device 300 (e.g., server 108) according to various embodiments of the present disclosure.

The electronic device 101 may include an image sensor 321, an image signal processor (ISP) 323, and a memory 325. The external electronic device 300 may include a recognition module 331, an ISP 333, and a storage unit 335. The recognition module 331 may be a logic module or implemented as a processor of the external electronic device 300. The ISP 333 may also be implemented as a processor of the external electronic device 300, which may perform both the image recognition and processing operations. Although not shown in the drawing, the electronic device 101 may include a communication module (e.g., including communication circuitry, such as, for example, and without limitation, communication interface 170 or communication module 220) that is capable of communicating data with the external electronic device 300. The external electronic device 300 may include a communication module for communicating data with the electronic device 1010.

The image sensor 321 may capture an image of an object and generate a raw image 322 of the object. The image sensor 321 may send the raw image 322 to the ISP 323. According to various embodiments of the present disclosure, the image sensor 321 may generate the raw image 322 and transmit the raw image 322 to the external electronic device 300 by means of its communication module. According to another embodiment, the processor of the electronic device 101 may generate a small raw image 326 and transmit the small raw image 326 to the external electronic device 300 by means of its communication module. The image sensor 321 may transmit the raw image 322 in a compressed format to the ISP 323 or the external electronic device 300. The image sensor 321 may store part of the raw image 323 in a compressed format in a memory inside the image sensor 321. The recognition module 331 of the external electronic device 300 may obtain the small raw image 326 by means of the communication module and perform segmentation to obtain at least one partial region from the small raw image 326. The recognition module 321 may recognize the at least one image region obtained as the segmentation result. It may be possible to generate information related to multiple image regions obtained from the recognition module 321, e.g., compensation region information 332 including at least one of coordinate information of the image region and recognition result. The compensation region information may be transmitted to the electronic device 101. The ISP 323 may compensate the raw image 322 based on the compensation region information to generate a compensated image 324. The compensated image 324 may, for example, be in a YUV format. The compensated image may be stored in the memory 325. The compensated image 324 may be compressed in a JPEG format and stored in the memory 325. According to various embodiments of the present disclosure, the raw image 322 generated by the image sensor 321 may be transmitted to the external electronic device 300 in separation from the small raw image 326. The raw image 322 is larger in size than the small raw image 326 such that the small raw image 326 is transmitted first to the external electronic device 300 and followed by the raw image 322. For example, the raw image 322 may be transmitted to the external electronic device 300 while the ISP 323 is compensating the raw image 322. The raw image 322 may be uploaded to the external electronic device 300 as it is generated or after a preprocess such as lens distortion compensation or noise cancellation. The preprocess may be performed by the external electronic device 300. The external electronic device 300 may perform a demosaic process, an image format conversion, and the like to improve the image recognition rate. The ISP 333 of the external electronic device 300 may compensate for the received raw image 322. The external electronic device 300 may compensate the raw image 322 based on the previously generated compensation region information 332 or extended compensation region information. The raw image 322 may have a resolution higher than that of the small raw image 326 such that the ISP 333 of the external electronic device 300 may acquire much detailed and extended compensation region information from a higher resolution image. The ISP 333 may generate the extended compensation region information based on the previously generated compensation region information and the raw image 322. The ISP 333 may acquire a high resolution image (high quality image) 334 by compensating the raw image 322 based on the extended compensation region information. The high resolution image 334 may be stored in the storage unit 335 of the external electronic device 300 or transmitted to the electronic device 101.

The external electronic device 300 may, for example, be implemented as a cloud server by way of example and, in this case, the ISP 333 of the external electronic device may be referred to as cloud ISP. The ISP 333 of the external electronic device may perform one of the various compensation operations such as original color mapping, detail re-generation, text reconstruction, image inpainting, scene based white balance (WB)/color adjustment, segmentation based noise reduction (NR)/sharpen, and segmentation based detail enhancement.

Figure 4:
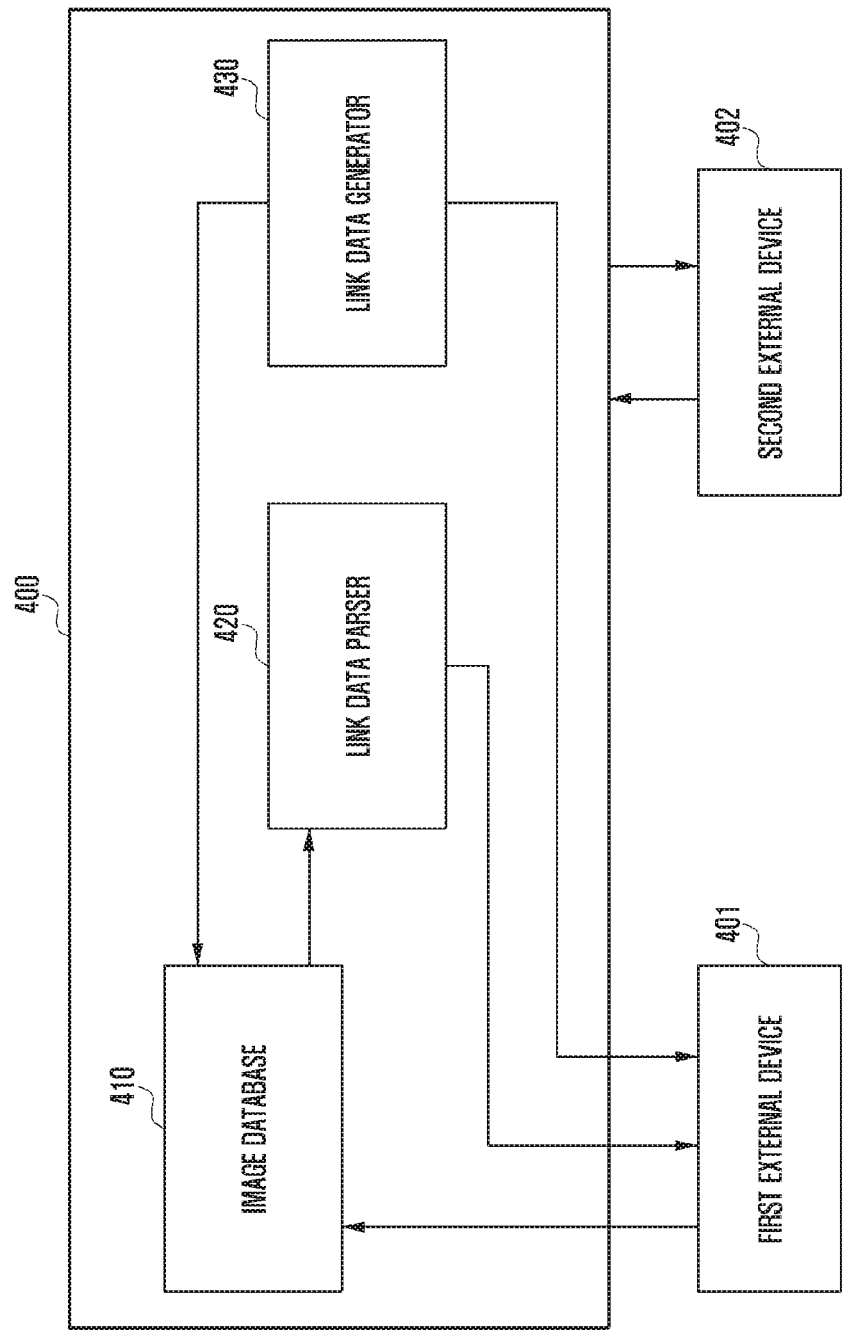
FIG. 4 is a diagram for illustrating an image sharing operation between an electronic device and at least one external electronic device according to various embodiments of the present disclosure.

FIG. 4 is a diagram illustrating an image sharing operation between an electronic device 400 and at least one external electronic device 401 and 402 according to various embodiments of the present disclosure.

The electronic device 400 may be identical or similar in configuration with the external electronic device 300 of FIG. 3. The electronic device 300 may be implemented as a cloud server and, in this case, the ISP of the external device may be referred to as cloud ISP.

Each of the first and second external electronic devices 401 and 402 may, for example, be a server (e.g., server 108 or SNS server).

A user or a user terminal (e.g., electronic device 101) may select at least one image from an image database 410 included in the electronic device 400 via the first external electronic device 401 or the second external device 402.

The electronic device 400 may determine whether there is link information associated with the at least one selected image. The electronic device 400 may include an image database 410, a link data parser 420, and a link data generator 430.

The image database 410 may store at least one image along with image-specific information and attribute information (e.g., metadata).

The attribute information may include at least one of camera setting information (e.g., exif information), supplementary information, and link information.

The link information may be information on the access right to the image stored in the electronic device 400 and it may be transmitted from the electronic device 400 to an external device (e.g., first external device 401 and second external device 402) for use in determining whether a user or user terminal (e.g., electronic device 1010 of FIG. 1) connected or accessed to the external device has the right to access the image stored in the electronic device 400.

The user or user terminal (e.g., electronic device 101 of FIG. 1) connected or accessed to the external device (e.g., first external device 401 and second external device 402) may access the images stored in the electronic device 400 without uploading any image to the external device (e.g., first external device 401 and second external device 402).

The image data base 410 may send the information on the at least one selected image to the link data parser 420. If the information on the at least one selected image includes the link information, the link data parser 420 may send the link information to the first external device 401 or the second external device 402.

If the information on the at least one selected image includes no link information, the link data parser 420 may send the information on the at least one selected image to the link data generator 430.

If the information on the at least one selected image is received, the link data generator 430 may generate link data of the at least one selected image and send the generated link data to the image data base 410 and the first external device 401 or the second external device 402.

According to various embodiments of the present disclosure, the link information may be the first information (e.g., uniform resource locator (URL) of the first and second external devices 401 and 402) received from the first and second external devices 401 and 402 to which at least one image is uploaded.

The first information may be used for indicating how the at least one selected image is shared with or uploaded by the first and second external devices 401 and 402.

According to various embodiments of the present disclosure, the link information may be the second information (e.g., URL and image identity information of the electronic device 400) for use in access to the electronic device 400 as the source for providing the selected image posted by the first and second electronic devices 401 and 402.

The second information may be used for posting the selected image to the server or SNS server (e.g., first and second external devices 401 and 402) in such a way of transmitting the link information corresponding to the at least one image selected from the electronic device 400 instead of uploading the image directly thereby providing the image to the electronic device 400 without use of images stored in the server or SNS server (e.g., the first and second external devices 401 and 402).

Figure 5:
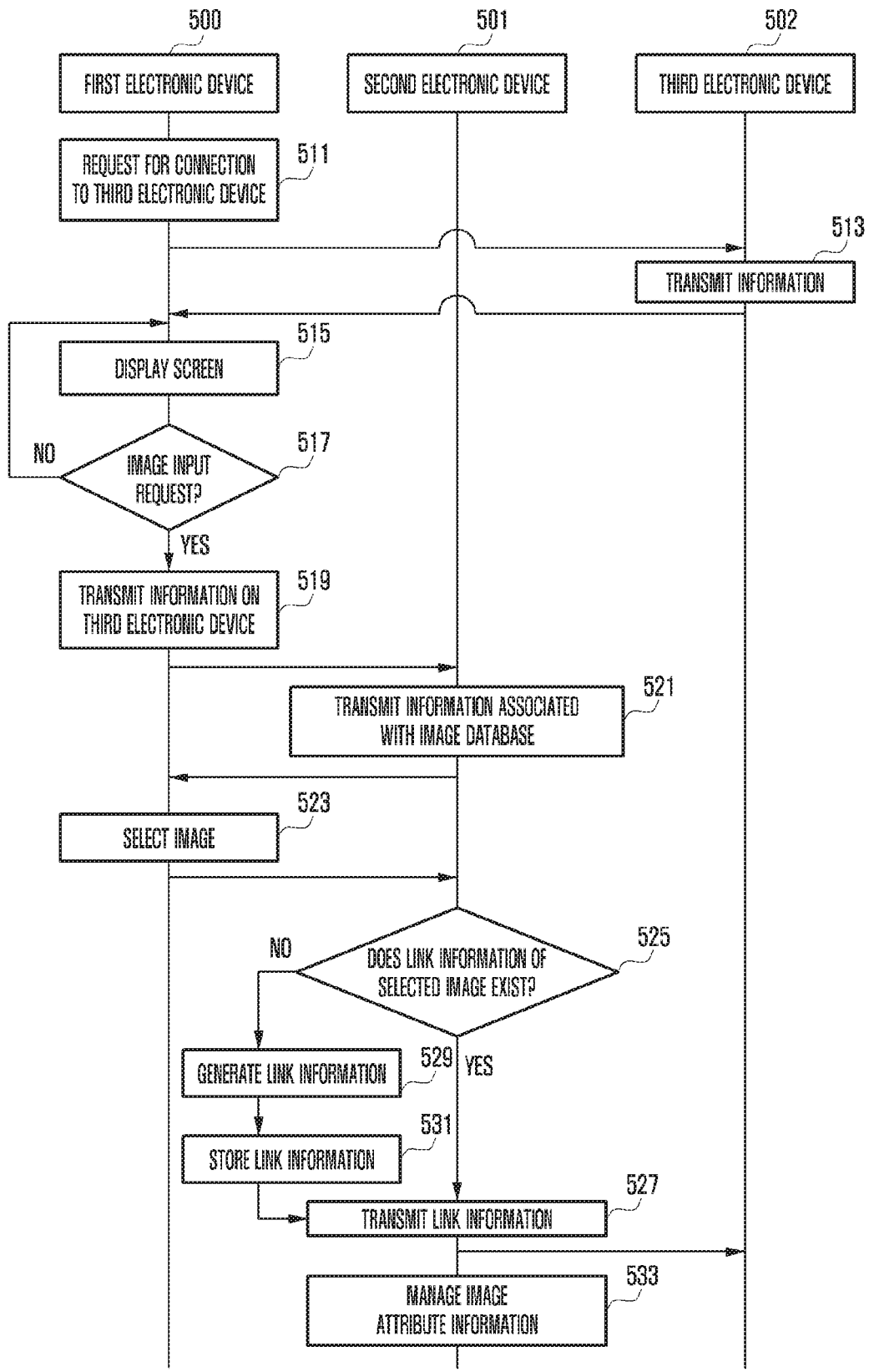
FIG. 5 is a flowchart illustrating a method for sharing images among first to third electronic devices according to various embodiments of the present disclosure.

FIG. 5 is a flowchart illustrating a method for sharing images among first to third electronic devices 500, 501, and 502 according to various embodiments of the present disclosure.

The first electronic device 500 may be identical or similar in configuration with the electronic device 100 of FIG. 1 or the electronic device 1010 of FIG. 3, and it may be a client device such as a mobile terminal.

The second electronic device 501 may be identical or similar in configuration with the external electronic device 300 of FIG. 3 or the electronic device 400 of FIG. 4 and it may be a cloud server.

The third electronic device 502 may be identical or similar in configuration with the first external device 401 or the second external device 402 of FIG. 4 and it may be an SNS server.

Each of the first electronic device 500, the second electronic device 501, and the third electronic device 502 may include at least one of a memory (e.g., memory 130 of FIG. 1), a processor (e.g., processor 120 of FIG. 1 including processing circuitry), a display device (e.g., display device 160 of FIG. 1), a communication module (e.g., communication module 190 and interface 177 of FIG. 1 including communication circuitry), and an input device (e.g., input device 150 of FIG. 1 including input circuitry).

According to various embodiments of the present disclosure, the first electronic device 500 may make a request, at step 511, for connection to the third electronic device 502 by means of its communication module in response to a user input received via its input device under the control of its processor.

According to various embodiments of the present disclosure, the third electronic device 502 may receive the connection request from the first electronic device 500 and transmit information to the first electronic device 500 via its communication module at step 513 under the control of its processor. The information being transmitted form the third electronic device 502 to the first electronic device 500 may include at least one of user interface (UI) information and screen identification (ID) information in use for an application flow.

According to various embodiments of the present disclosure, the first electronic device 500 may display a screen associated with the third electronic device 502 on its display, at step 515, based on the information received from the third electronic device 502 under the control of its processor. The screen associated with the third electronic device 502 may be a website, a webpage screen, and an application screen by way of example.

According to various embodiments of the present disclosure, the first electronic device 500 may receive an image input request from its input device at step 517 under the control of its processor. The image input request may be a request for uploading an image on the website, webpage screen, or application screen of the third electronic device 502.

According to various embodiments of the present disclosure, if no image input request is received at step 517 under the control of the processor of the first electronic device 500, the procedure may return to step 515.

According to various embodiments of the present disclosure, if the image input request is received at step 517 under the control of the processor of the first electronic device 500, the procedure may go to step 519.

According to various embodiments of the present disclosure, the first electronic device 500 may transmit the information on the third electronic device 502 to the second electronic device 501 by means of its communication module under the control of its processor at step 519. The information on the third electronic device which is transmitted from the first electronic device 500 to the second electronic device 501 may include at least one of the website information, webpage information, and the screen ID information in use for an application flow.

According to various embodiments of the present disclosure, the second electronic device 501 may receive the image input request and the information on the third electronic device and transmit the information on the image database to the first electronic device by means of its communication module at step 521. The image database information includes a list of at least one image stored in the second electronic device 501, which may be transmitted to the first electronic device 500 in a thumbnail format as preview or miniaturized images.

According to various embodiments of the present disclosure, the first electronic device 500 may display the image database containing information on at least one image on its display, receive a user input made by means of its input device for selecting at least one image from the displayed image database, and transmit the image selection information to the second electronic device 501, at step 523.

According to various embodiments of the present disclosure, upon receipt of the information for selecting at least one image from the first electronic device 500, the second electronic device 501 may determine at step 525 whether the at least one selected image has link information.

According to various embodiments of the present disclosure, if it is determined at step 525 that the at least one selected image has the link information, the procedure may go to step 527.

According to various embodiments of the present disclosure, if it is determined at step 525 that the at least one selected image has no link information, the procedure may go to step 529.

According to various embodiments of the present disclosure, if it is determined at step 525 that the at least one selected image has the link information, the second electronic device 501 may transmit the link information of the image to the third electronic device 502 by means of its communication under the control of its processor at step 527.

According to various embodiments of the present disclosure, the second electronic device 501 may transmit the link information of the image to the third electronic device 502 by means of its communication module and generate a cache image associated with the image under the control of its processor at step 527.

According to various embodiments of the present disclosure, if it is determined at step 525 that the at least one selected image has no link information, the second electronic device may generate link information of the image under the control of its processor at step 529.

According to various embodiments of the present disclosure, the second electronic device 501 may store the link information of the image under the control of its processor at step 531, and the procedure may go to step 527.

According to various embodiments of the present disclosure, the second electronic device 501 may manage attribute information of the image of which link information is transmitted to the third electronic device 502 under the control of its processor at step 533. The image attribute information management operation may be performed in such a way of ascertaining the filters applied to the image, the posting history of the image, the linkage history of the image, the music mapped to the image, and the contents mapped to the image and managing the ascertained information as the image attributes information.

Figure 6:
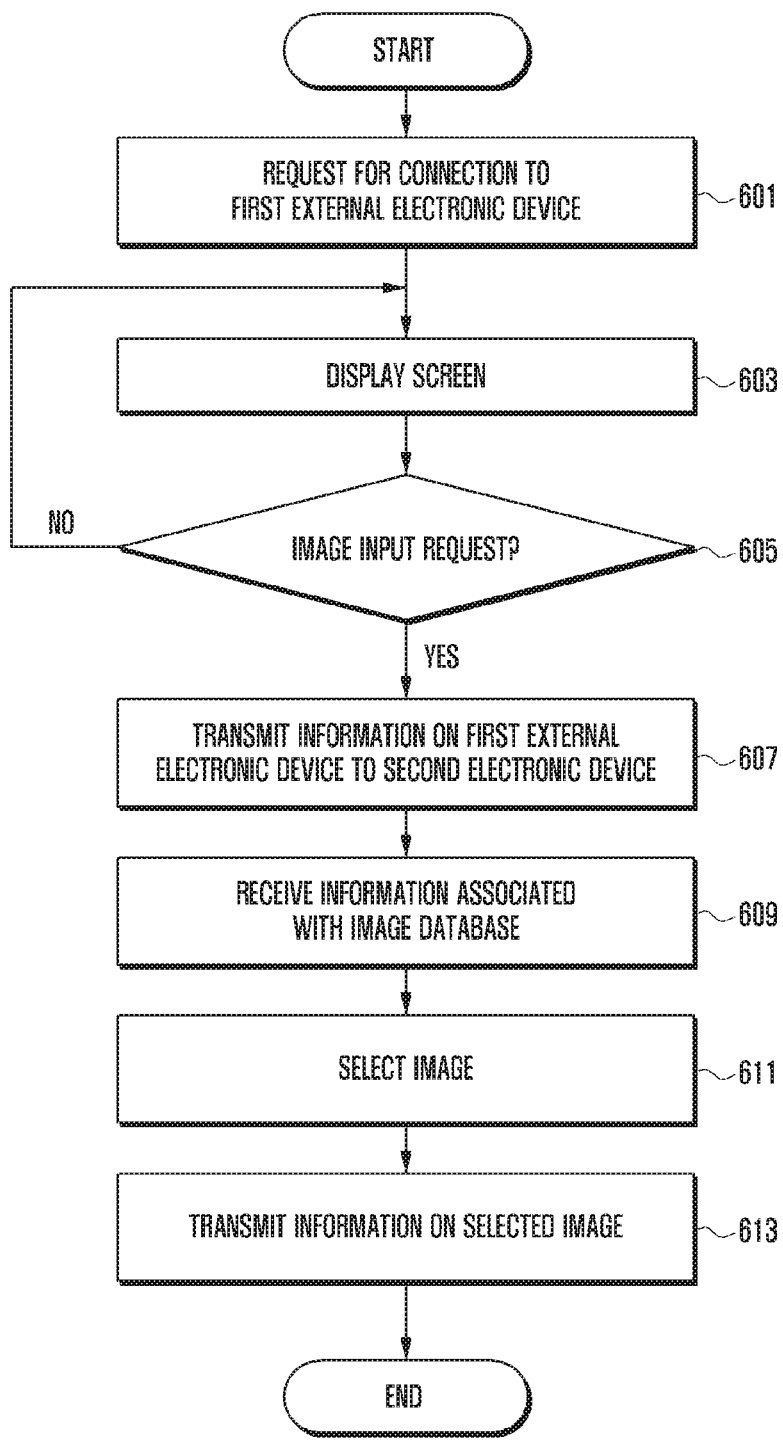
FIG. 6 is a flowchart illustrating an image sharing method of the electronic device 101 according to various embodiments of the present disclosure.

FIG. 6 is a flowchart illustrating an image sharing method of the electronic device 101 according to various embodiments of the present disclosure.

The electronic device 101 may be identical or similar in configuration with the first electronic device 500 of FIG. 5, the electronic device 100 of FIG. 1, or the electronic device 101 of FIG. 3 and it may be a client device in the form of a portable device by way of example.

According to various embodiments of the present disclosure, the electronic device 101 may make a connection request to a first external electronic device under the control of its processor 120 at step 601.

According to various embodiments of the present disclosure, if the electronic device 101 makes the connection to the first electronic device at step 601, at least one of the images stored in the memory 130 may be displayed on the display device 160. The at least one image may be the image acquired by means of the camera module 180 or received from an external device by means of the communication module 190.

The first external electronic device may be identical or similar in configuration with the third electronic device 502 of FIG. 5 or the first external device 401 or the second external device 402 of FIG. 4 and it may be an SNS server by way of example.

According to various embodiments of the present disclosure, the electronic device 101 may display, at step 603, a screen associated with the first external electronic device on the display device 160 based on the information received from the first external electronic device under the control of the processor 120. The screen associated with the first external electronic device may be a website, a webpage screen, or an application screen by way of example. The information on the first external electronic device that is received from the first external electronic device may include at least one of screen configuration information, UI information, and screen ID in use for an application flow.

According to various embodiments of the present disclosure, the electronic device 101 may determine at step 605 whether an image input request is received via the input device 150. The image input request may be a request for uploading an image on the website, webpage screen, or application screen of the third electronic device first external electronic device.

According to various embodiments of the present disclosure, if the electronic device 101 receives no image input request via the input device 150 under the control of the processor 120 at step 605, the procedure may return to step 603.

According to various embodiments of the present disclosure, if the electronic device 101 receives the image input request via the input device 150 under the control of the processor 120 at step 605, the procedure may go to step 607.

According to various embodiments of the present disclosure, the electronic device 101 may transmit the information on the first external electronic device to the second external electronic device under the control of the processor 120 at step 607. The second external electronic device may be identical or similar in configuration with the second electronic device 501 of FIG. 5, the external electronic device 300 of FIG. 3, or the electronic device 400 of FIG. 4 and it may be a cloud server. The information on the first external electronic device that is transmitted from the electronic device 101 to the second external electronic device may include at least one of website information, webpage information and screen ID information in use for an application flow.

According to various embodiments of the present disclosure, the electronic device 101 may receive an image database containing information on at least one image by means of the communication module 190 under the control of the processor 120 at step 609. The image database information includes a list of at least one image stored in the second external electronic device, which may be transmitted to the first electronic device 101 in a thumbnail format as preview or miniaturized images.

According to various embodiments of the present disclosure, the electronic device 101 may display the image database containing information on at least one image on the display 160 of the first electronic device 101 and receive a user input made by means of its input device 150 for selecting at least one image from the displayed image database at step 611.

According to various embodiments of the present disclosure, the electronic device 101 may transmit the information on the selected image to the second external electronic device by means of the communication module 190 under the control of the processor 120 at step 613.

Figure 7:
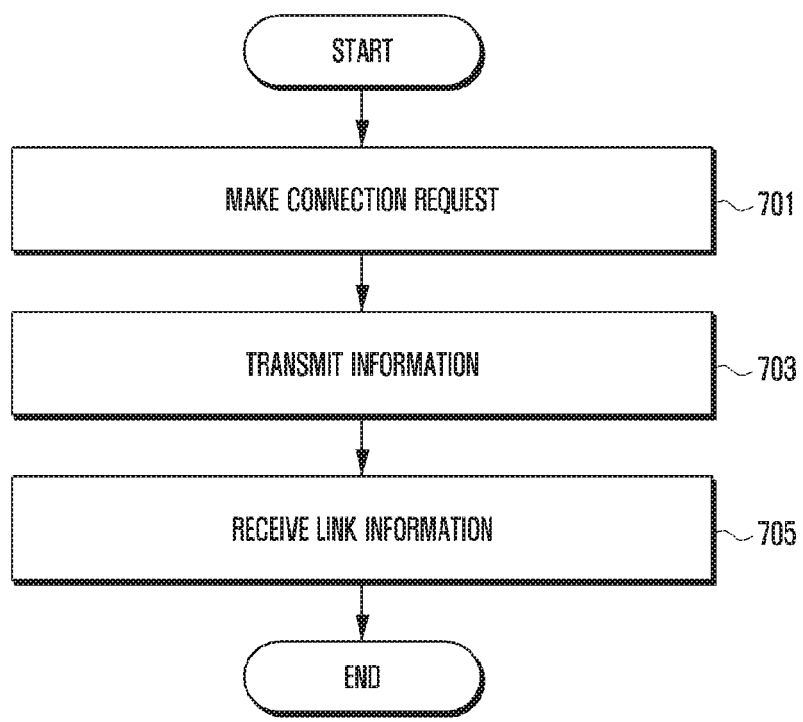
FIG. 7 is a flowchart illustrating an image sharing method of an electronic device according to various embodiments of the present disclosure.

FIG. 7 is a flowchart illustrating an image sharing method of an electronic device (e.g., third electronic device 502 of FIG. 5) according to various embodiments of the present disclosure.

According to various embodiments of the present disclosure, the electronic device (e.g., third electronic device 502 of FIG. 5) may make a connection request to a client device (e.g., electronic device 101 of FIG. 1 and first electronic device 500 of FIG. 5) under the control of a processor (e.g., processor 120 of FIG. 1) at step 701.

According to various embodiments of the present disclosure, the electronic device (e.g., third electronic device 502 of FIG. 5) may transmit the information on the electronic device (e.g., third electronic device 502 of FIG. 5 and first electronic device 500 of FIG. 5) to the client device (e.g., electronic device 101 of FIG. 1 and first electronic device 500 of FIG. 5) under the control of the processor (e.g., processor 120 of FIG. 1) at step 703. The information on the electronic device (e.g., third electronic device 502 of FIG. 5) may include at least one of screen configuration information, UI information, and screen ID information in use for an application flow.

According to various embodiments of the present disclosure, the electronic device (e.g., third electronic device 502 of FIG. 5) may receive the link information from a cloud server (e.g., second electronic device 501 of FIG. 5) under the control of the processor (e.g., processor 120 of FIG. 1) at step 705.

Figure 8A:
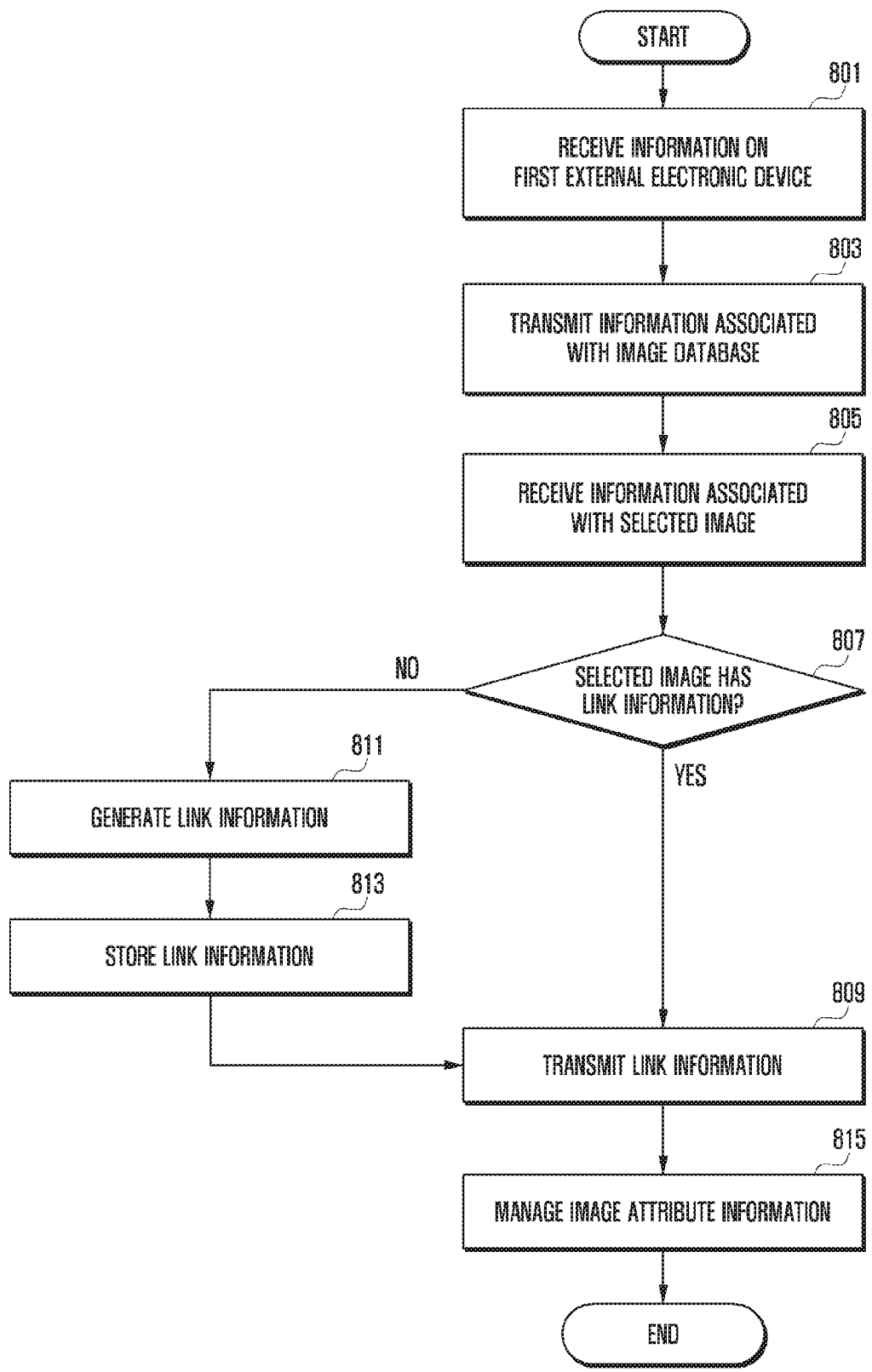
FIG. 8A is a flowchart illustrating an image sharing method of an electronic device according to various embodiments of the present disclosure.

FIG. 8A is a flowchart illustrating an image sharing method of an electronic device (e.g., second electronic device of FIG. 5) according to various embodiments of the present disclosure.

According to various embodiments of the present disclosure, the electronic device (e.g., second electronic device 501 of FIG. 5) may receive information on the first external electronic device (e.g., third electronic device 502 of FIG. 5) from the second external electronic device (e.g., first electronic device 500 of FIG. 5) under the control of the processor (e.g., processor 120 of FIG. 1) at step 801. The information on the first external electronic device (e.g., third electronic device 502 of FIG. 5) that is transmitted from the second external electronic device (e.g., first electronic device 500 of FIG. 5) to the electronic device (e.g., second electronic device 501 of FIG. 5) may include at least one of website information, webpage information, and screen ID information in use for an application flow.

According to various embodiments of the present disclosure, the electronic device (e.g., second electronic device 501 of FIG. 5) may receive the information on the first external electronic device (e.g., third electronic device 502 of FIG. 5) from the second external electronic device (e.g., first electronic device 500 of FIG. 5) and transmit image database information to the second external electronic device (e.g., first electronic device 500 of FIG. 5) by means of the communication module (e.g., communication module 190 of FIG. 1) under the control of the processor (e.g., processor 120 of FIG. 1) at step 803. The image database information includes a list of at least one image stored in the electronic device (e.g., second electronic device 501 of FIG. 5), which may be transmitted to the second external electronic device (e.g., first electronic device 500 of FIG. 1) in a thumbnail format as preview or miniaturized images.

According to various embodiments, the electronic device (e.g., second electronic device 501 of FIG. 5) may receive the information related to the image selected by the user at the second external electronic device (e.g., first electronic device 500 of FIG. 5) by means of the communication module (e.g., communication module 190 of FIG. 1) under the control of the processor (e.g., processor 120 of FIG. 1) at step 805.

According to various embodiments of the present disclosure, the electronic device (e.g., second electronic device 501 of FIG. 5) may determine whether the selected image has link information under the control of the processor (e.g., processor 120 of FIG. 1) at step 807.

According to various embodiments of the present disclosure, if the electronic device (e.g. second electronic device 501 of FIG. 5) determines at step 807 that the selected image has the link information under the control of the processor (e.g., processor 120 of FIG. 1), the procedure may go to step 809.

According to various embodiments of the present disclosure, if the electronic device (e.g., second electronic device 501 of FIG. 5) determines at step 807 that the selected image has no link information under the control of the processor (e.g., processor 120 of FIG. 1), the procedure may go to step 811.

According to various embodiments of the present disclosure, the electronic device (e.g., second electronic device 501 of FIG. 5) may transmit the link information to the first external electronic device (e.g., third electronic device 502 of FIG. 5) under the control of the processor (e.g., processor 120 of FIG. 1) at step 809.

According to various embodiments of the present disclosure, the electronic device (e.g., second electronic device 501 of FIG. 5) may transmit the link information of the image to the first external electronic device (e.g., third electronic device 502 of FIG. 5) and generate a cache image associated with the image under the control of the processor (e.g., processor 120 of FIG. 1) at step 809.

According to various embodiments of the present disclosure, the electronic device (e.g., second electronic device 501 of FIG. 5) may generate the link information under the control of the processor (e.g., processor 120 of FIG. 1) at step 811.

According to various embodiments of the present disclosure, the electronic device (e.g., second electronic device 501 of FIG. 5) may store the link information under the control of the processor (e.g., processor 120 of FIG. 1) at step 813, and the procedure may go to step 809.

According to various embodiments of the present disclosure, the electronic device (e.g., second electronic device 501 of FIG. 5) may manage image attribute information about the image of which link image is transmitted to the first external electronic device (e.g., third electronic device 502 of FIG. 5) under the control of the processor (e.g., processor 120 of FIG. 1) at step 815. The image attribute information management operation may be performed in such a way of ascertaining the filters applied to the image, the posting history of the image, the linkage history of the image, the music mapped to the image, and the contents mapped to the image and managing the ascertained information as the image attributes information.

Figure 8B:
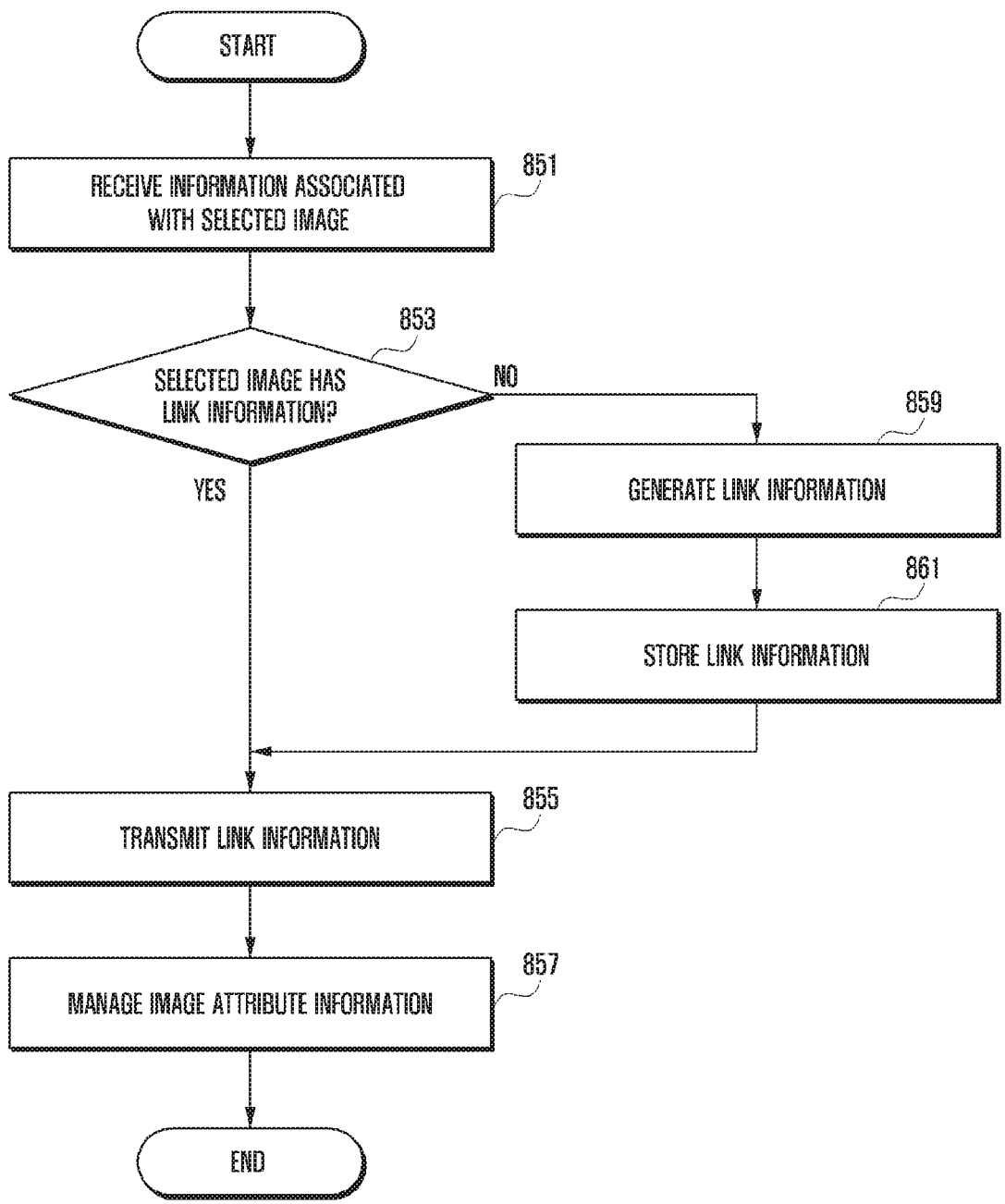
FIG. 8B is a flowchart illustrating an image sharing method of an electronic device according to various embodiments of the present disclosure.

FIG. 8B is a flowchart illustrating an image sharing method of an electronic device (e.g., second electronic device 501 of FIG. 5) according to various embodiments of the present disclosure.

According to various embodiments of the present disclosure, the electronic device (e.g., second electronic device 501 of FIG. 5) may receive information on the image selected by a user at the second external electronic device (e.g., first electronic device of FIG. 5) under the control of the processor (e.g., processor 120 of FIG. 1) at step 851.

According to various embodiments of the present disclosure, the electronic device (e.g., second electronic device 501 of FIG. 5) may determine at step 853 whether the selected image has link information under the control of the processor (e.g., processor 120 of FIG. 1) at step 853.

According to various embodiments of the present disclosure, if the electronic device (e.g., second electronic device 501 of FIG. 5) determines at step 853 that the selected image has the link information under the control of the processor (e.g., processor 120 of FIG. 1), the procedure may go to step 855.

According to various embodiments of the present disclosure, if the electronic device (e.g., second electronic device 501 of FIG. 5) determines at step 853 that the selected image has no link information under the control of the processor (e.g., processor 120 of FIG. 1), the procedure may go to step 859.

According to various embodiments of the present disclosure, the electronic device (e.g., second electronic device 501 of FIG. 5) may transmit the link information to the first external electronic device (e.g., third electronic device 502 of FIG. 5) under the control of the processor (e.g., processor 120 of FIG. 1) at step 855.

According to various embodiments of the present disclosure, the electronic device (e.g., second electronic device 501 of FIG. 5) may transmit the link information of the image to the first external electronic device (e.g., third electronic device 502 of FIG. 5) and generate a cache image associated with the image under the control of the processor (e.g., processor 120 of FIG. 1) at step 855.

According to various embodiments of the present disclosure, the electronic device (e.g., second electronic device 501 of FIG. 5) may generate the link information under the control of the processor (processor 120 of FIG. 1) at step 859.

According to various embodiments of the present disclosure, the electronic device (e.g., second electronic device 501 of FIG. 5) may store the generated link information under the control of the processor (e.g., processor 120 of FIG. 1) at step 861, and the procedure may go to step 855.

According to various embodiments of the present disclosure, the electronic device (e.g., second electronic device 501 of FIG. 5) may manage image attribute information about the image of which link image is transmitted to the first external electronic device (e.g., third electronic device 502 of FIG. 5) under the control of the processor (e.g., processor 120 of FIG. 1) at step 857. The image attribute information management operation may be performed in such a way of ascertaining the filters applied to the image, the posting history of the image, the linkage history of the image, the music mapped to the image, and the contents mapped to the image and managing the ascertained information as the image attributes information.

Figure 9:
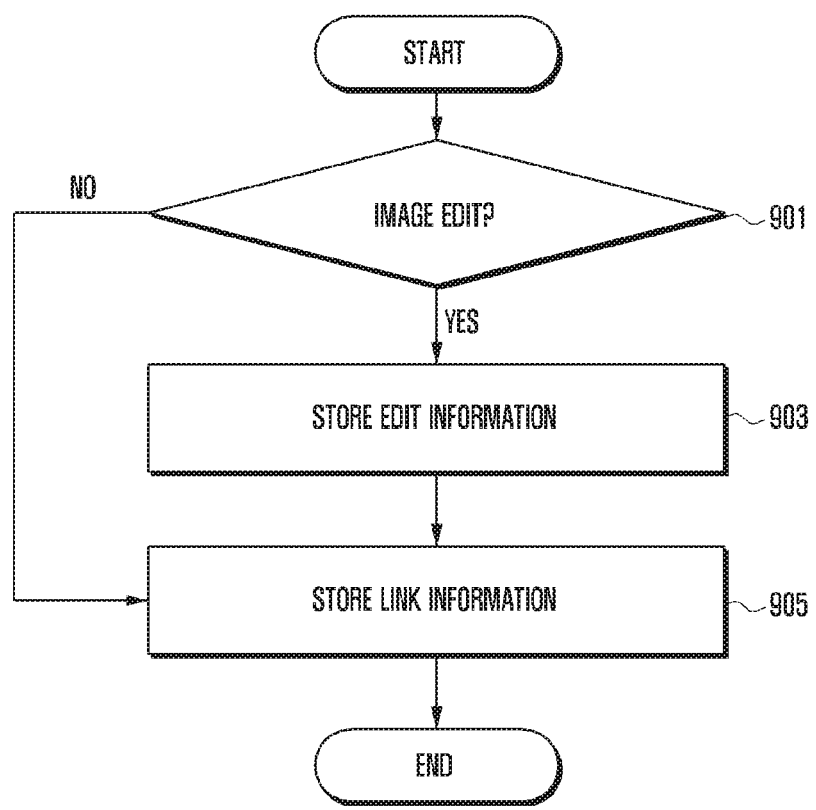
FIG. 9 is a flowchart illustrating a method for managing image attribute information management method according to various embodiments of the present disclosure.

FIG. 9 is a flowchart illustrating a method for managing image attribute information management method of an electronic device (e.g. second electronic device 501 of FIG. 1) according to various embodiments of the present disclosure.

According to various embodiments of the present disclosure, the electronic device (e.g., second electronic device 501 of FIG. 5) may determine at step 901 whether the selected image has been edited under the control of the processor (e.g., processor 120 of FIG. 1).

According to various embodiments of the present disclosure, if the electronic device (e.g., second electronic device 501 of FIG. 5) determines at step 901 that the selected image has been edited under the control of the processor (e.g., processor 120 of FIG. 1), the procedure may go to step 903.

According to various embodiments of the present disclosure, if the electronic device (e.g., second electronic device 501 of FIG. 5) determines at step 901 that the selected image has not been edited under the control of the processor (e.g., processor 120 of FIG. 1), the procedure may go to step 905. The image editing may include, for example, applying a filter, image upscaling, image downscaling, and image rotation.

According to various embodiments of the present disclosure, the electronic device (e.g., second electronic device 501 of FIG. 5) may store the edit information of the selected image under the control of the processor (e.g., processor 120 of FIG. 1) at step 903.

According to various embodiments of the present disclosure, the operation of storing the edit information of the selected image at step 903 may be an operation of storing the metadata of the selected image.

According to various embodiments of the present disclosure, the electronic device (e.g., second electronic device 501 of FIG. 5) may store the link information of the selected image under the control of the processor (e.g., processor 120 of FIG. 1) at step 905.

According to various embodiments of the present disclosure, the operation of storing the link information of the selected image at step 905 may be an operation of storing the metadata of the selection image.

Figure 10:
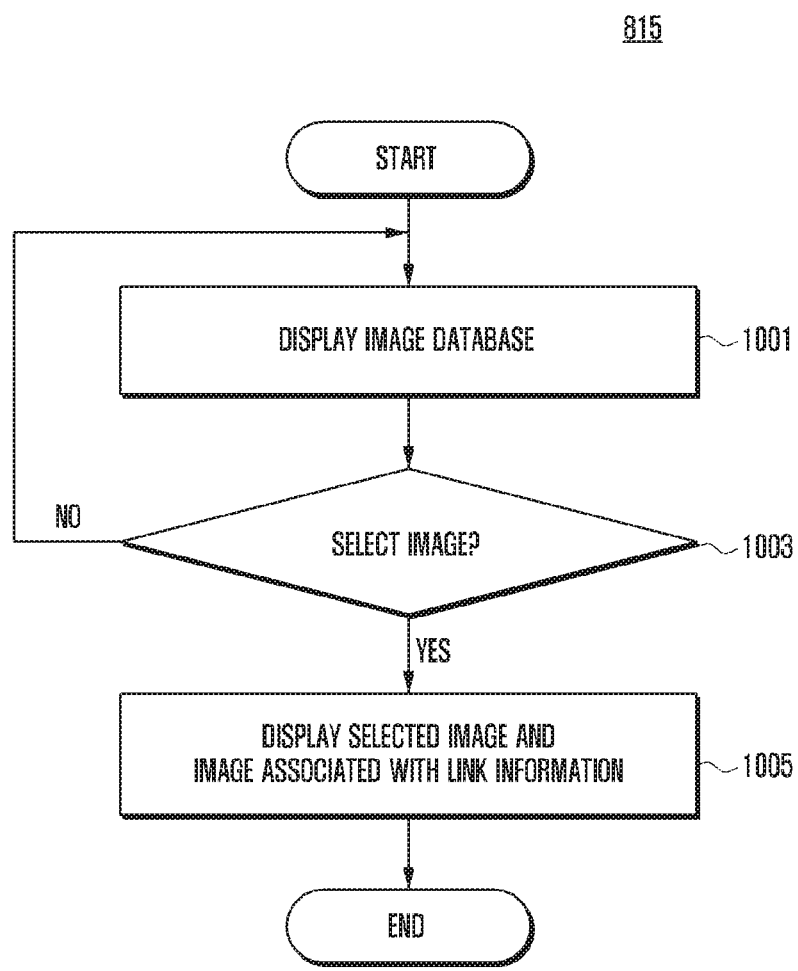
FIG. 10 is a flowchart illustrating a shared image management method of an electronic device according to various embodiments of the present disclosure.

FIG. 10 is a flowchart illustrating a shared image management method of an electronic device 101 according to various embodiments of the present disclosure.

According to various embodiments of the present disclosure, the electronic device (e.g., electronic device 101 of FIG. 1 and first electronic device 500 of FIG. 5) may display, at step 1001, an image database of a cloud server (e.g., second electronic device 501) on the display device 160 according to a user request under the control of the processor 120. The operation of displaying the image database may include an operation of displaying at least one image, which may include an image taken by the camera module 180 and a representative image associated with the link information (e.g., icon, SNS icon, thumbnail image, an icon-related badge image), the representative image associated with the link information being displayed on at least part of the image taken by the camera module 180. The at least one image may be an image taken by the camera module 180 and the representative image associated with the link information, which may, for example, be an image resized from an icon, an SNS icon, a thumbnail image, and an icon-related badge image.

The at least one image may be an image taken by the camera module 180 and a representative image associated with the link information, which may be an image downscaled from an icon, an SNS icon, a thumbnail image, and an icon-related badge image.

According to various embodiments of the present disclosure, the electronic device (e.g., electronic device 101 of FIG. 1 and first electronic device 500 of FIG. 5) may determine at step 1003 whether an input for selecting at least one image from the display image database is received via the input device 150 under the control of the processor 120.

According to various embodiments of the present disclosure, if the electronic device (e.g., electronic device 101 of FIG. 1 and first electronic device 500 of FIG. 5) receives the input for selecting at least one image from the display image database via the input device 150 under the control of the processor 120, the procedure may go to step 1005.

According to various embodiments of the present disclosure, if the electronic device (e.g., electronic device 101 of FIG. 1 and first electronic device 500 of FIG. 5) receives no input for selecting at least one image from the display image database via the input device 150 under the control of the processor 120, the procedure may return to step 1001.

According to various embodiments of the present disclosure, if an input for selecting at least one image from the display image database is received via the input device 150, the electronic device (e.g., electronic device 101 of FIG. 1 and first electronic device 500 of FIG. 5) may display the selected image and a representative image (e.g., icon and SNS icon) associated with the link information of the selected image on the display device 160 under the control of the processor 120 in step 1005. The selected image and the representative image associated with the link information may be displayed to fill the whole screen of the display device 160. According to various embodiments of the present disclosure, the selected image and the representative image associated with the link information may be displayed so as to be enlarged in comparison with the unselected images. According to various embodiments of the present disclosure, the selected image and the representative image associated with the link information may be displayed on the display device 160 in the form of a popup image.

Figure 11:
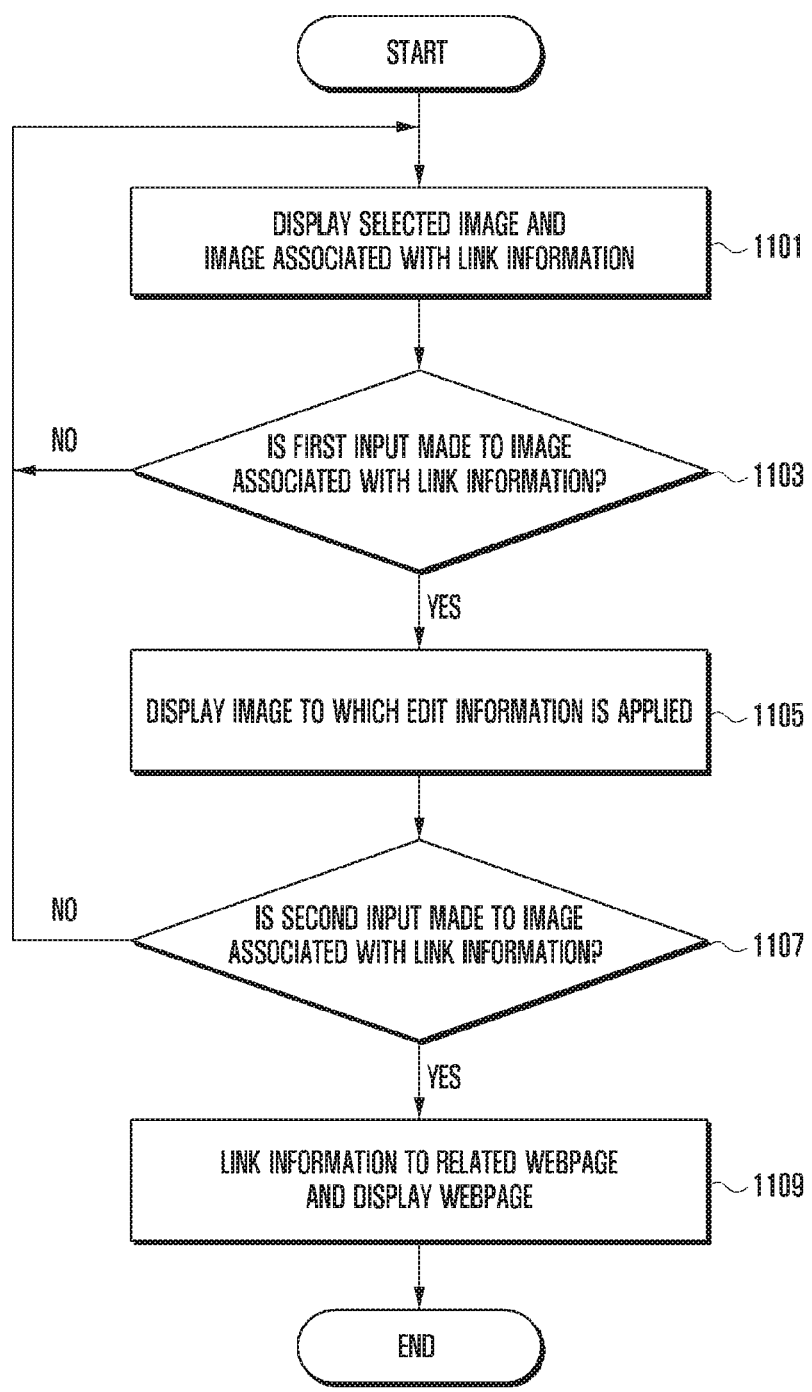
FIG. 11 is a flowchart illustrating a shared image management method of the electronic device according to various embodiments of the present disclosure.

FIG. 11 is a flowchart illustrating a shared image management method of the electronic device 101 according to various embodiments of the present disclosure.

According to various embodiments of the present disclosure, the electronic device (e.g., electronic device 101 of FIG. 1 and first electronic device 500 of FIG. 5) may display, at step 1101, a selected image and a representative image (e.g., icon or SNS icon) associated with the link information of the selected image on the display device 160 under the control of the processor 120. The selected image and the representative image associated with the link information may be displayed to fill the whole screen of the display device 160. According to various embodiments of the present disclosure, the selected image and the representative image associated with the link information may be displayed to be enlarged in comparison with the unselected images. According to various embodiments of the present disclosure, the selected image and the representative image associated with the link information may be displayed on the display device 160 in the form of a popup image.

According to various embodiments of the present disclosure, the electronic device (e.g., electronic device 101 of FIG. 1 and first electronic device 500 of FIG. 5) may determine at step 1103, whether a first input made to the representative image associated with the link information is received via the input device 150 under the control of the processor 120. The first input may be made by a touch to the representative image associated with the link information on a touchscreen.

According to various embodiments of the present disclosure, if the electronic device (e.g., electronic device 101 of FIG. 1 and first electronic device 500 of FIG. 5) receives, at step 1103, no first input made to the representative image associated with the link information via the input device 150 under the control of the processor 120, the procedure may return to step 1101.

According to various embodiments of the present disclosure, if the electronic device (e.g., electronic device 101 of FIG. 1 and first electronic device 500 of FIG. 5) receives the first input made to the representative image associated with the link information via the input device 150 under the control of the processor 120, the procedure may go to step 1105.

According to various embodiments of the present disclosure, the electronic device (e.g., electronic device 101 of FIG. 1 and first electronic device 500 of FIG. 5) may display, at step 1105, the image to which edit information is applied on the display device 160 under the control of the processor 120. For example, the image may be display on the display device 160 based on the information on the editing (e.g., rotation, filtering, and resizing) applied to a website, a webpage, an application page corresponding to the link of the selected image.

According to various embodiments of the present disclosure, the electronic device (e.g., electronic device 101 of FIG. 1 and first electronic device 500 of FIG. 5) may determine at step 1107 whether a second input made to the representative image associated with the link information is received via the input device 150 under the control of the processor 120. The second input may be made by a touch to the representative image associated with the link information on the touchscreen.

According to various embodiments of the present disclosure, if the electronic device (e.g., electronic device 101 of FIG. 1 and first electronic device 500 of FIG. 5) receives, at step 1107, no second input made to the representative image associated with the link information via the input device 150 under the control of the processor 120, the procedure may return to step 1101.

According to various embodiments of the present disclosure, if the electronic device (e.g., electronic device 101 of FIG. 1 and first electronic device 500 of FIG. 5) receives, at step 1107, the second input made to the representative image associated with the link information via the input device 150 under the control of the processor 120, the procedure may go to step 1109.

According to various embodiments of the present disclosure, if the electronic device (e.g., electronic device 101 of FIG. 1 and first electronic device 500 of FIG. 5) may link, at step 1109, the link information of the selected image to a webpage, website, or application screen and display the webpage, website, or application screen on the display device 160. The webpage, website, or application screen may be displayed to fill the whole screen of the display device 160. The webpage, website, or application screen may be displayed on the display device 160 in the form of a popup image.

Figure 12A:
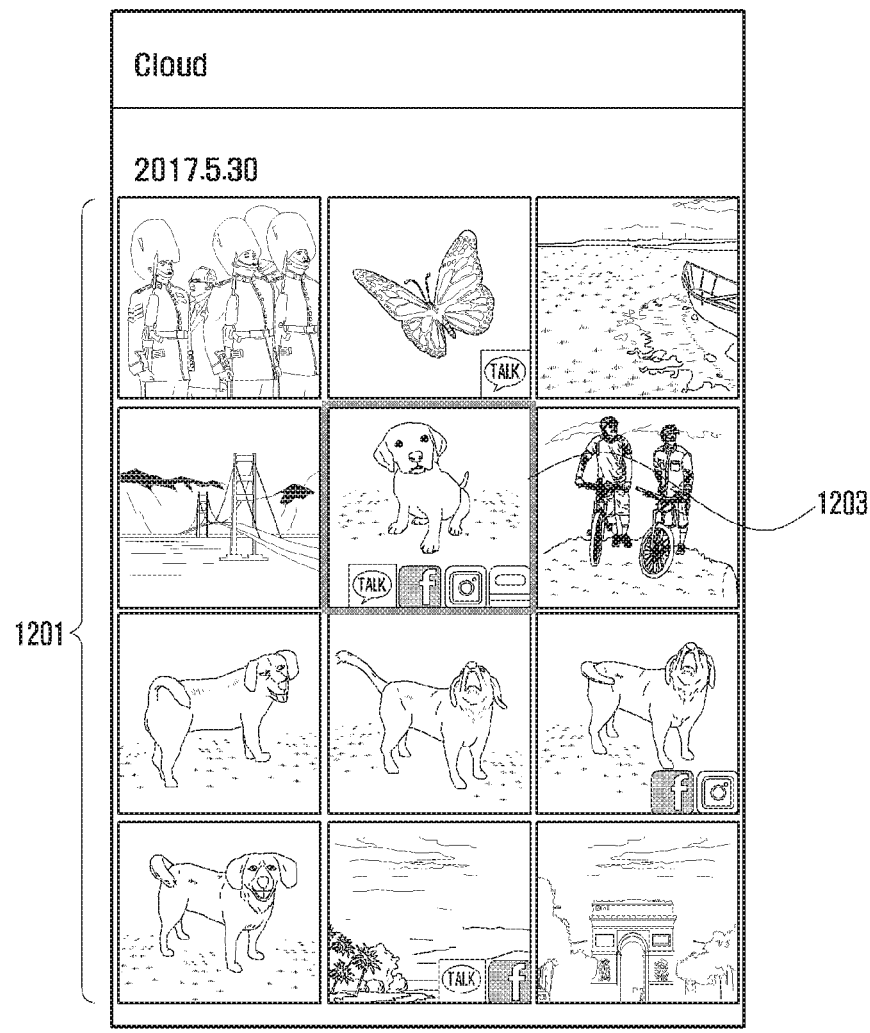
FIGS. 12A and 12B are diagrams illustrating example screen displays of the shared image management method of FIG. 10.
Figure 12B:
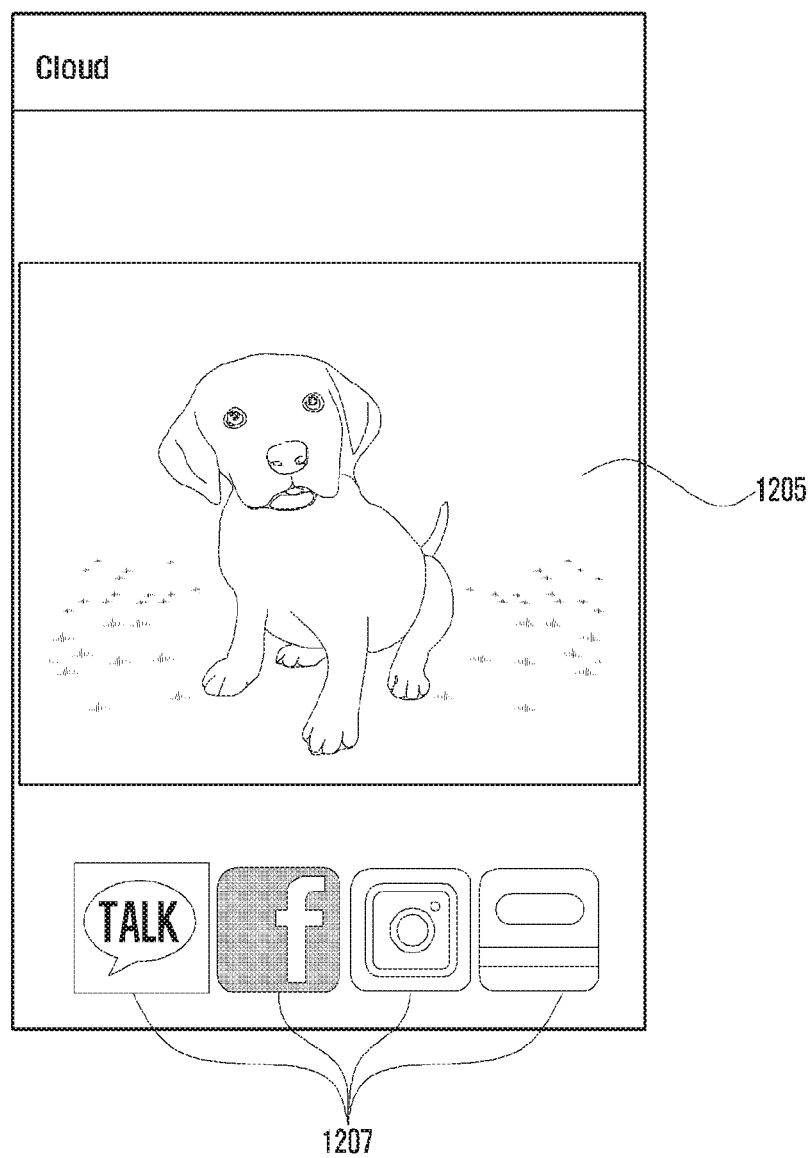

FIGS. 12A and 12B are diagrams illustrating example screen displays of the shared image management method of FIG. 10.

As shown in FIG. 12A, the electronic device (e.g., electronic device 101 of FIG. 1 and electronic device 500 of FIG. 5) may display an image database 1201 of the cloud server (e.g., second electronic device 501 of FIG. 5) on the display device 160 in response to a user request. The operation of displaying the image database 1201 may include an operation of displaying at least one image 1203, which may include an image taken by the camera module 180 and a representative image associated with the link information (e.g., icon and SNS icon), the representative image associated with the link information being displayed on at least part of the image taken by the camera module 180.

As shown in FIG. 12B, if an input for selecting the at least one image 1203 from the displayed image database is received via the input device 150, it may be possible to display the selected image 1205 and the representative image 1207 (e.g., icon and SNS icon) associated with the link information of the selected image on the display unit 160. The selected image and the representative image associated with the link information may be displayed to fill the whole screen of the display device 160. According to various embodiments of the present disclosure, the selected image and the representative image associated with the link information may be displayed to be enlarged in comparison with the unselected images. According to various embodiments of the present disclosure, the selected image 1205 and the representative image 1207 associated with the link information may be displayed on the display device 160 in the form of a popup image.

Figure 13A:
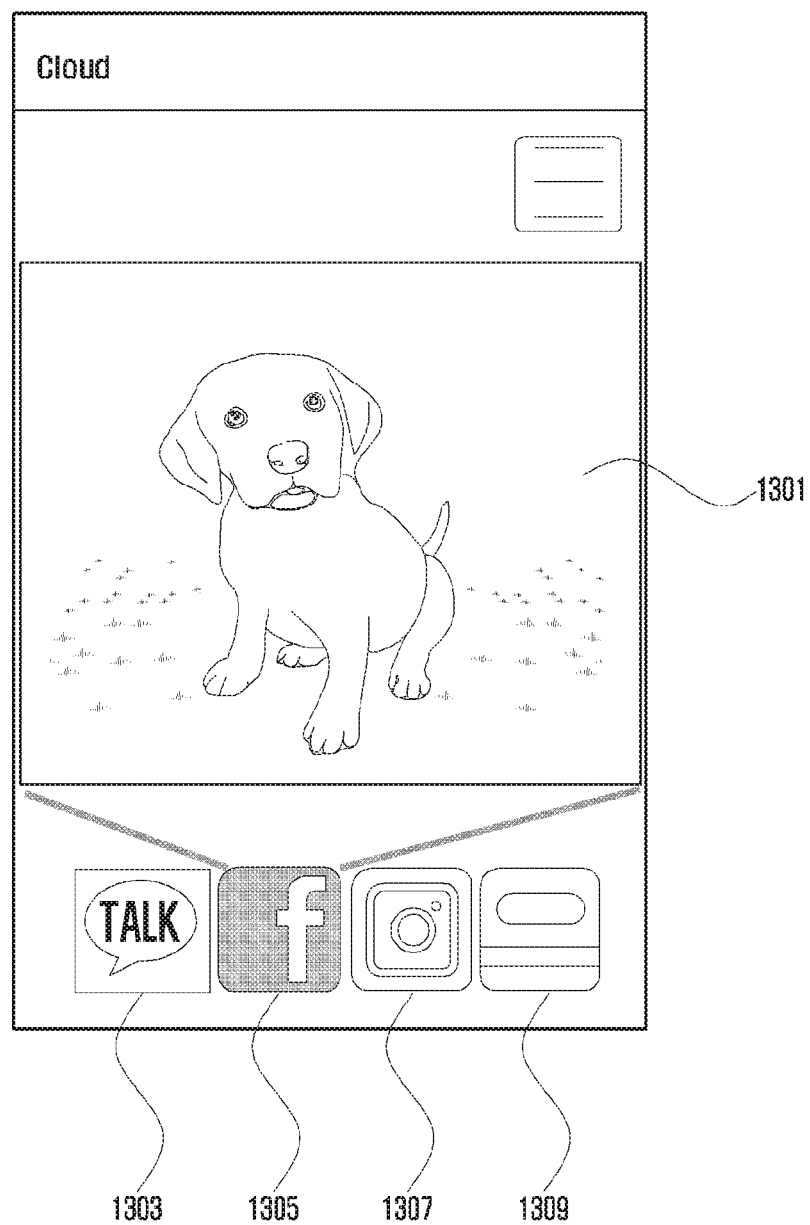
FIGS. 13A and 13B are diagrams illustrating example screen displays of the shared image management method of FIG. 11.
Figure 13B:
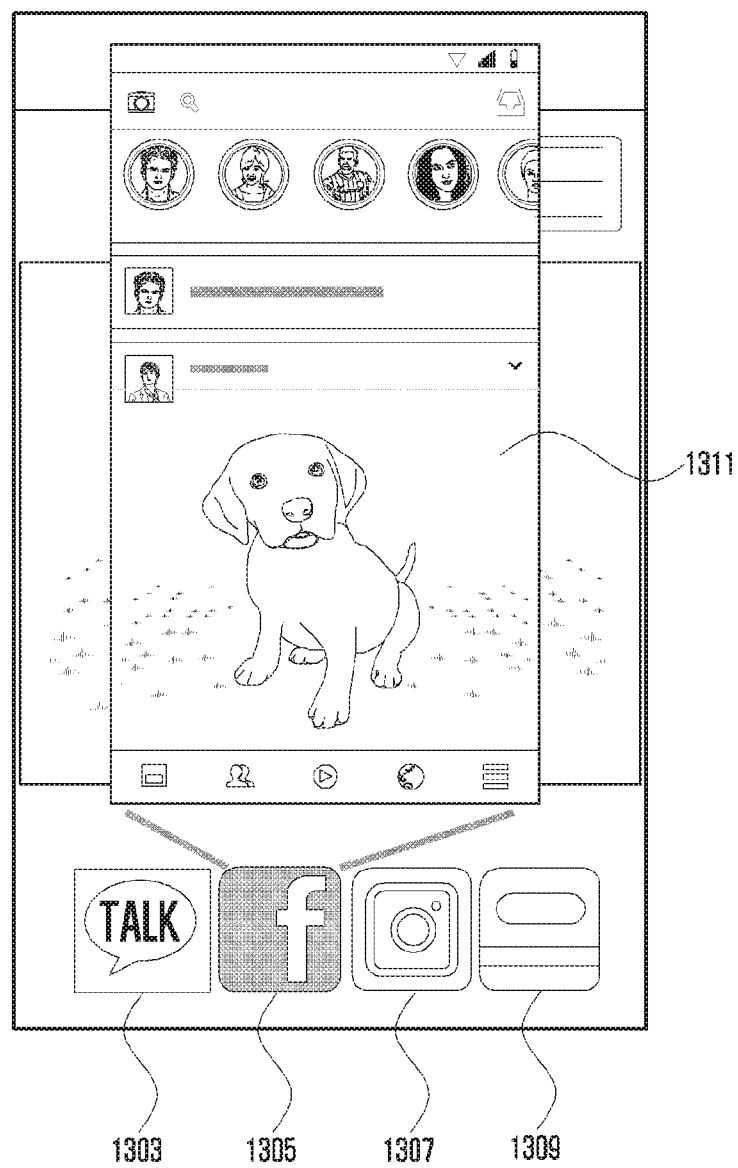

FIGS. 13A and 13B are diagrams illustrating example screen displays of the shared image management method of FIG. 11.

As shown in FIG. 13A, the electronic device (e.g., electronic device 101 of FIG. 1 and electronic device 500 of FIG. 5) may display the selected image 1301 and the representative images 1303, 1305, 1307, and 1309 (e.g., icon and SNS icon) associated with the link information of the selected image on the display device 160. The selected image 1301 and the representative images 1303, 1305, 1307, and 1309 (e.g., icon and SNS icon) associated with the link information of the selected image may be display on the whole screen. According to various embodiments of the present disclosure, the selected image 1301 and the representative images 1303, 1305, 1307, and 1309 (e.g., icon and SNS icon) associated with the link information of the selected image may be displayed to be enlarged in comparison with the unselected images. According to various embodiments of the present disclosure, the selected image 1301 and the representative images 1303, 1305, 1307, and 1309 (e.g., icon and SNS icon) associated with the link information of the selected image may be displayed in the form of a popup image.

In FIG. 13A, if a first input is received, the electronic device (e.g., electronic device 101 of FIG. 1 and electronic device 500 of FIG. 5) may display an image to which the editing information is applied on the display device 160. For example, it may be possible to display the image on the display device 160 based on the editing information (e.g., rotation, filtering, and resizing) applied to the website, webpage, or application page corresponding to the link information of the selected image.

As shown in FIG. 13B, if a second input is received, the electronic device (e.g., electronic device 101 of FIG. 1 and electronic device 500 of FIG. 5) may link the link information of the selected image to the webpage, website, or application screen and display the webpage, website, or application screen 1311 on the display device 160. The webpage, website, or application screen may be displayed to fill the whole screen of the display device 160. The webpage, website, or application screen 1311 may be displayed on the display device 160 in the form of a popup image.

As described above, the image sharing method and device of the present disclosure is advantageous in terms of reducing data service cost and facilitating image history management by sharing images through a cloud service.

According to various embodiments of the present disclosure, the electronic device may be one of various types of devices. Examples of the electronic device may include, for example, and without limitation, mobile communication devices (e.g., smartphone), computer devices, portable multimedia devices, portable medical devices, cameras, wearable devices, and electric appliances). However, the electronic device according to an embodiment of the present disclosure is not limited to the aforementioned devices.

Various embodiments of the present disclosure are described in detail with reference to accompanying drawings in detail. The embodiments and terms used therein are not intended to limit the disclosure but to help understand the present disclosure, and it should be understood that the embodiments include all changes, equivalents, and/or substitutes within the spirit and scope of the disclosure. The same reference numbers are used throughout the drawings to refer to the same or like parts. As used herein, the singular forms "a", "an" and "the" are intended to include the plural forms as well, unless the context clearly indicates otherwise. As used herein, terms such as "first," "second," etc. are used to describe various components. However, the components should not be defined by these terms. The terms are used simply for distinguishing one component from another component. For example, a first component may be referred to as a second component and likewise, a second component may also be referred to as a first component, without departing from the teaching of the inventive concept. When it is mentioned that a (first) component is "connected" to or "accessed" by another (second) component, it may be understood that the component is directly connected to or accessed by the other component or that still other (third) component is interposed between the two components.

In the present disclosure, the term "module" is intended to include a unit implemented in hardware, software, firmware or any combinations thereof. For example, the term "module' may be interchangeably used with the terms "logic," "logical block," "part," and "circuit" in a mutually compatible manner. A module may be an integrated part, a smallest unit performing one or more functions, or a part of the unit. For example, a module may be implemented as an application-specific integrated circuit (ASIC).

The various embodiments of the present disclosure may be implemented in the form of a software program (e.g., program 140) including instructions stored in a machine-readable (e.g., computer-readable) storage medium (e.g., internal memory 136 and external memory 138). The machine may be a device which is capable of calling out and execute an instruction from the storage medium to perform an operation, examples of the machine may include the electronic devices disclosed in the embodiments (e.g., electronic device 101). If the instruction is executed by a processor (e.g., processor 120), the processor may execute a corresponding function autonomously or control other components to execute the corresponding function. The instruction may include a code generated or executed by a compiler or an interpreter. The machine-readable storage medium may be a non-transitory storage medium.

A method according to any of various embodiments of the present disclosure may be provided in the form of a computer program product. The computer program product may be traded between a seller and a buyer. The computer program product may be distributed on a machine-readable storage medium (e.g., compact disc read only memory (CD-ROM)) or through an application store (e.g., Play Storer™). In the case of the on-line distribution, at least part of the computer program product may be temporarily store or instantly generated in a storage medium such as memory of a manufacturer's server, an application store sever, or a relay server.

The components (e.g., module and program) according to various embodiments of the present disclosure may include at least one of the aforementioned components with omission of some components or addition of other components. Alternatively or additionally, the components (e.g., module and program) may be selectively combined into an entity to perform the functions of the components equally as before the combination or in similar manners. The operations of the modules, programming modules, or other components according to various embodiments of the present disclosure may be executed in series, in parallel, recursively, or heuristically; also, some operations may be executed in different order, omitted, or extended with other operations.

While the present disclosure has been illustrated and described with reference to various example embodiments thereof, it will be understood that the various example embodiments are intended to be illustrative, not limiting. It will be further understood that various changes in form and details may be made without departing from the spirit and scope of the disclosure, as defined, for example, in the appended claims.

What is claimed is:

1. An electronic device comprising:
   a communication module comprising communication circuitry;
   a memory; and
   a processor,
   wherein the processor is configured to:
      control the communication module to receive, from an external electronic device, information on an image selected to be shared with another external electronic device;
      determine whether link information of the selected image is stored as part of attribute information of the selected image;
      based on determining that link information is stored as part of the attribute information of the selected image, control the communication module to transmit, as selected image link information, the stored link information to the other external electronic device;
      based on determining that link information is not stored as part of the attribute information of the selected image, generate the selected image link information and control the communication module to transmit the selected image link information to the other external electronic device; and
      store, as part of the attribute information of the selected image and in association with the selected image link information, information regarding the other external electronic device,
   wherein the selected image link information includes image identity information of the external device, and a uniform resource locator of the electronic device.

2. The electronic device of claim 1, wherein the processor is configured control the electronic device to: check a request for transmission of the selected image link information to the other external electronic device and control the communication module to transmit the selected image link information to the other external electronic device based on the request.

3. The electronic device of claim 2, wherein the processor is configured to control to store the information regarding the other external electronic device as part of the selected image link information.

4. The electronic device of claim 3, wherein the processor is configured to control the electronic device to: associate a first icon image corresponding to the information regarding the other external electronic device with the selected image and control the communication module to transmit, to the external device, the first icon image.

5. The electronic device of claim 1, wherein the processor is configured to control to store edit information for the selected image and to control the communication module to transmit the edit information to the other external electronic device.

6. The electronic device of claim 1, wherein the processor is configured to determine whether the attribute information includes edit information associated with the selected image and, if so, to store the edit information.

7. An image sharing method of an electronic device, the method comprising:

receiving, from an external device, information on an image selected to be shared with another external electronic device;

determining whether link information of the selected image is stored as part of attribute information of the selected image;

based on determining that link information is stored as part of the attribute information of the selected image, transmitting, as selected image link information, the stored link information to the other external electronic device;

based on determining that link information is not stored as part of the attribute information of the selected image, generating the selected image link information and transmitting the selected image link information to the other external electronic device; and storing, as part of the attribute information of the selected image and in association with the selected image link information, information regarding the other external electronic device, wherein the selected image link information includes image identity information of the external electronic device, and a uniform resource locator of the electronic device.

8. The method of claim 7, further comprising checking a request for transmission of the selected image link information to the other external electronic device; and transmitting the selected image link information to the other external electronic device based on the request.

9. The method of claim 8, further comprising storing the information regarding the other external electronic device as part of the selected image link information in a memory.

10. The method of claim 9, further comprising:

associating a first icon image corresponding to the information regarding the other external electronic device with the selected image; and transmitting, to the external device, the first icon image via communication circuitry.

11. The method of claim 7, further comprising:

determining whether the attribute information includes edit information associated with the selected image; and storing, based on the attribute information being determined to include edit information associated with the selected image, the edit information.

* * * * *